United States Patent
Southwell et al.

(10) Patent No.: US 7,960,951 B2
(45) Date of Patent: Jun. 14, 2011

(54) DIGITAL CALIBRATION WITH LOSSLESS CURRENT SENSING IN A MULTIPHASE SWITCHED POWER CONVERTER

(75) Inventors: Scott Wilson Southwell, Seal Beach, CA (US); Benjamim Tang, Rancho Palos Verdes, CA (US); Robert T. Carroll, Andover, MA (US); Steven Joseph Schulte, Scottsdale, AZ (US)

(73) Assignee: Primarion Corporation, Torrance, CA (US)

( * ) Notice: Subject to any disclaimer, the term of this patent is extended or adjusted under 35 U.S.C. 154(b) by 141 days.

(21) Appl. No.: 11/779,487

(22) Filed: Jul. 18, 2007

(65) Prior Publication Data

US 2007/0257650 A1 Nov. 8, 2007

Related U.S. Application Data

(63) Continuation of application No. 10/884,840, filed on Jul. 2, 2004, now Pat. No. 7,262,628.

(51) Int. Cl.
*G05F 1/595* (2006.01)
(52) U.S. Cl. .......................... 323/272; 323/283; 323/220
(58) Field of Classification Search .................. 323/283, 323/272, 220; 324/769, 759, 601, 713, 130; 702/107, 65
See application file for complete search history.

(56) References Cited

U.S. PATENT DOCUMENTS

| | | | |
|---|---|---|---|
| 4,282,578 A | 8/1981 | Payne et al. | |
| 4,908,682 A * | 3/1990 | Takahashi | 257/336 |
| 5,079,456 A * | 1/1992 | Kotowski et al. | 327/538 |
| 5,894,394 A | 4/1999 | Baba et al. | |
| 5,910,745 A | 6/1999 | Zarabadi | |
| 5,959,464 A | 9/1999 | Qualich | |
| 6,177,786 B1 * | 1/2001 | Shimamori | 323/283 |
| 6,424,129 B1 * | 7/2002 | Lethellier | 323/272 |
| 6,445,155 B1 | 9/2002 | Williams et al. | |
| 6,469,481 B1 | 10/2002 | Tateishi | |
| 6,559,684 B2 * | 5/2003 | Goodfellow et al. | 327/53 |
| 6,768,313 B1 * | 7/2004 | Hamai et al. | 324/537 |
| 6,791,304 B2 * | 9/2004 | Pearce et al. | 323/283 |
| 6,803,750 B2 * | 10/2004 | Zhang | 323/222 |
| 6,850,102 B2 * | 2/2005 | Hsu et al. | 327/157 |
| 6,894,464 B2 | 5/2005 | Zhang | |
| 6,906,536 B2 | 6/2005 | Pearce et al. | |
| 6,954,054 B2 | 10/2005 | Brown | |
| 6,965,838 B1 | 11/2005 | Bandholz | |

(Continued)

OTHER PUBLICATIONS

Multipath Current Measurement System, Nov. 1, 1988, IBM Technical Disclosure Bulletin, vol. 31, Issue No. 6, Cross Reference 0018-8689-31-6-485, Page Nos. 485-487.*

(Continued)

*Primary Examiner* — Harry Behm
(74) *Attorney, Agent, or Firm* — The Noblitt Group, PLLC

(57) ABSTRACT

Disclosed is a multi-phase power regulator that accurately senses current at a load in a lossless manner and adjusts the power supplied to the load based on the sensed current. Also disclosed is a method of calibrating a multiphase voltage regulator by applying a known calibration current at the load and determining actual current values by the difference in measured values between when the known calibration current is applied and when it is not applied. The accurate current is determined at a known temperature and accurate temperature compensation is provided by a non-linear digital technique. Each phase of the multi-phase power regulator is individually calibrated so that balanced channels provide accurate power to the load. Also disclosed is a calibration method with minimal noise generation.

11 Claims, 13 Drawing Sheets

U.S. PATENT DOCUMENTS

| | | |
|---|---|---|
| 7,027,944 B2 | 4/2006 | Tabaian et al. |
| 7,050,920 B2 | 5/2006 | Abe |
| 2002/0144163 A1* | 10/2002 | Goodfellow et al. ......... 713/300 |
| 2002/0171985 A1* | 11/2002 | Duffy et al. ..................... 361/90 |
| 2003/0006650 A1* | 1/2003 | Tang et al. ...................... 307/43 |
| 2003/0038617 A1* | 2/2003 | Yaklin .......................... 323/304 |

OTHER PUBLICATIONS

Yang Zhang. Regan Zane, Dragan Maksimovic, Aleksandar Prodic, On-line Calibration of Lossless Current Sensing, Feb. 2004, Applied Power electronics Conference and Exposition 2004, APEC '04 Nineteenth Annuall IEEE, vol. 2, pp. 1345-1350.*

* cited by examiner

| PHASE 1 | PHASE 2 | PHASE 3 | PHASE 4 | CALIBRATION CURRENT | CALIBRATION CURRENT ALTERNATIVE |
|---|---|---|---|---|---|
| 1 | 1 | 1 | 1 | 1 | 0 |
| 1 | 0 | 1 | 1 | 1 | 0 |
| 1 | 0 | 0 | 1 | 1 | 0 |
| 1 | 0 | 0 | 0 | 1 | 0 |
| 1 | 1 | 0 | 0 | 1 | 0 |
| 0 | 1 | 0 | 0 | 1 | 0 |
| 0 | 1 | 1 | 0 | 1 | 0 |
| 0 | 0 | 1 | 0 | 1 | 0 |
| 0 | 0 | 1 | 1 | 1 | 0 |
| 0 | 0 | 0 | 1 | 1 | 0 |
| 0 | 0 | 0 | 1 | 0 | 1 |
| 1 | 0 | 0 | 1 | 0 | 1 |
| 1 | 0 | 0 | 0 | 0 | 1 |
| 1 | 1 | 0 | 0 | 0 | 1 |
| 0 | 1 | 0 | 0 | 0 | 1 |
| 0 | 1 | 1 | 0 | 0 | 1 |
| 0 | 0 | 1 | 0 | 0 | 1 |
| 0 | 0 | 1 | 1 | 0 | 1 |
| 0 | 0 | 0 | 1 | 0 | 1 |
| 1 | 0 | 0 | 1 | 0 | 1 |
| 1 | 1 | 0 | 1 | 0 | 1 |
| 1 | 1 | 1 | 1 | 0 | 1 |

DIGITAL CALIBRATION WITH LOSSLESS CURRENT SENSING IN A MULTIPHASE SWITCHED POWER CONVERTER

CROSS REFERENCES TO RELATED APPLICATIONS

This application is a continuation of U.S. Nonprovisional patent application Ser. No. 10/884,840, filed Jul. 2, 2004, now U.S. Pat. No. 7,262,628, and incorporates the disclosure of that application by reference.

BACKGROUND OF THE INVENTION

1. Technical Field of Invention

The present invention relates, generally, to power regulation systems and, in particular, to providing precisely regulated power to a microelectronic device such as a microprocessor. Precision power regulation is accomplished by accurate lossless current measurements, temperature compensation and digital calibration.

2. Background of the Invention

Regulated power supplies or voltage regulators are typically required to provide the voltage and current supply to microelectronic devices. The regulator is designed to deliver power from a primary source to an electrical load at the specified current, voltage, and power efficiency. Switching power converters (SPC) also referred to as Buck regulators are commonly used voltage regulators due to their high efficiency, high current capability, and topology flexibility. In addition, they can be designed to provide very precise voltage and current characteristics required by devices such as microprocessors, microcontrollers, memory devices, and the like.

Power requirements for emerging leading edge technology microprocessors have become very difficult to satisfy. As the speed and integration of microprocessors increases, the demands on the power regulation system increase. In particular, as gate counts increase, the power regulation current demand increases, the operating voltage decreases and transient events (e.g. relatively large voltage spikes or droops at the load) typically increase in both magnitude and frequency. Some emerging microprocessors are expected to run on less than 1.3 volts and more than 100 amperes.

SPC's utilizing step-down multi-phase Buck converters have been the preferred topology to meet the low voltage and high current requirements of microprocessors. With the advent of increasingly complex power regulation topologies, digital techniques for power converter control, specifically in multiphase designs, can improve precision and reduce the system's total parts count while also supporting multiple applications in the same power system through digitally programmable feedback control.

Existing feedback controls have taken voltage measurements from the load, as well as from the individual output phases. The feedback information has been used to adjust the width of the pulses produced by each of the phases of a multi-phase buck regulator system to bring the supplied voltage and current within the load line tolerances specified by the microprocessor manufacturer. Active Transient Response (ATR) has been used for high frequency response to rapidly changing power requirements at the load by quickly activating multiple phases to supply or drain (as the case required) more current to or from the load, thereby temporarily over riding the generally slower overall voltage regulator system response.

The measurement of load current is important for meeting microprocessor power requirements that specify a load line and active voltage positioning by defining narrow parameters within which current must be supplied at a specified voltage. In addition, leading edge microprocessors may specify current levels that must not be exceeded to avoid damage. Nevertheless, realization of accurately measured current amplitude has been problematic.

One way of measuring load current would be to insert a precision resistor in the load current path. For example, the precision resistor can be inserted In series with the inductor to measure current through each phase of the high side FETs. As another example, a precision resistor can be connected between the low side FET and ground. The voltage across the precision resistor divided by the known value of the resistor provides the amplitude of the current. This technique is lossy as the precision resistor consumes power and generates heat. This heat generation and power loss is a substantial problem that is even more significant when operating under battery power.

The power loss can be reduced by inserting a resistor and taking a current measurement in only one phase and extrapolating that measurement to approximate the current in the other phases. However, this reduces the accuracy of the measurements and fails to provide information for balancing the channels. Moreover, the power that is consumed and the heat that is generated by this lossy technique is still excessive and undesirable.

SUMMARY OF THE INVENTION

The present application describes techniques for accurately measuring load current in a lossless way and utilizing such accurate current measurements for improved power regulation to the load.

The current measurements can be taken at various points in the circuitry, all in a lossless (or quasi-lossless) way. By way of example, the current measurement can be taken at the inductor, at the high side FET or at the low side FET. The current measurement can then be used to calibrate the voltage regulator (VR).

In accordance with one aspect of the invention, the on resistance of the drain to source path (RDSON) of a low side FET is determined by coupling a precise current source to the load. The RDSON is determined by first measuring the voltage at the low side FET when the load is in its quiescent state so that only leakage current is present. This first measurement is stored. A second voltage measurement is taken with the injection of a precise known current at the load. The second voltage is caused by the known current plus the leakage current. A comparison of the first and second measured voltages (e.g. by subtracting one voltage from the other) provides the voltage caused by the known current and a simple division of that voltage by the known current provides the RDSON value. This measurement and determination of RDSON is then performed for each phase of a multi-phase system.

However, it is known that RDSON varies with temperature, increasing approximately 0.39% per degree Centigrade. Accordingly, the invention provides for also storing the temperature at which RDSON is measured. In accordance with the invention, measured temperatures are stored. The non-linear aspects of temperature variations are compensated.

Other factors that can be compensated through calibration with current measurements include variations in current sense amplifier characteristics, voltage offset caused by leakage current at the load as well as the inductance of package leads. In accordance with the present invention, these effects can also be measured and compensated.

In accordance with another embodiment of this invention, current is measured at the high side FET. This can be accomplished, for example, by placing a current mirror and precision resistor in parallel with the high side FET. The voltage across the precision resistor is a measure of the current, which is at a known ratio with the actual current through the high side FET. The effective resistance (Reffective) is equal to the value of the precision current mirror resistor (Rmirror) divided by the mirror current ratio. The measurement can be taken twice, as in the aforementioned embodiment, to separately measure the leakage current. Even with the use of the precision current mirror resistor, this method is near lossless as the current passing through the current mirror is a small fraction (current mirror ratio) of the load current.

In accordance with a still further embodiment of the invention, the lossless current measurement is taken at an inductor. A series connected resistor and capacitor are connected in parallel with the inductor. The current is determined by measuring the voltage across the capacitor. This measurement provides the DC resistance (DCR) of the incuctor. As in the other embodiments, the measurement is taken twice at each phase, i.e. first with the calibration current on and then with the calibration current off. The order in which the measurements are taken can be reversed, i.e. first with the calibration current off and then with it on.

In accordance with the present invention, an advantageous calibration technique that minimizes noise is utilized at startup. During calibration, the load is maintained in a quiescent state and the voltage at the load is brought to a potential level at which calibration measurements will be taken. At this point, all the phases of the multi-phase system are on. Assume that at this point the calibration current is also on. However, it is desired to take calibration measurements with only one phase active. In order to sequentially achieve the condition of only one phase being active with minimized noise and optimized accuracy, only one phase at a time is switched. The current in the first phase is measured when only that one phase is on. During this first measurement, the current value determined will be the sum of the leakage current and calibration current. After the current in each phase has been individually measured and stored, the calibration current is turned off and the current in each phase is measured again. As was done during the first measurement, only one phase is switched at a time until the current in each phase has been measured again when only that phase is active. The current measured during the second measurement is the leakage current. These current measurements together with temperature measurements provide the accurate data to calibrate the voltage regulator.

These and other features of the invention will become more apparent in the following more detailed description and claims when considered in connection with the drawings where like reference numerals refer to similar elements throughout the Figures.

DETAILED DESCRIPTION

The present invention may be described herein in terms of various functional components and various processing steps. It should be appreciated that such functional components may be realized by any number of hardware or structural components configured to perform the specified functions. For example, the present invention may employ various integrated components comprised of various electrical devices, e.g. resistors, transistors, capacitors, inductors and the like, whose values may be suitably configured for various intended purposes. Any actual values provided for such components as well as applied voltage levels and currents are intended by way of example and not limitation.

In addition, the present invention may be practiced in any integrated circuit application. Such general applications and other details that will be apparent to those skilled in the art in light of the present disclosure are not described in detail herein. Further, it should be noted that while various components may be suitably coupled or connected to other components within exemplary circuits, such connections and couplings can be realized by direct connection between components, or by connection through other components and devices located therebetween.

Figure 1:
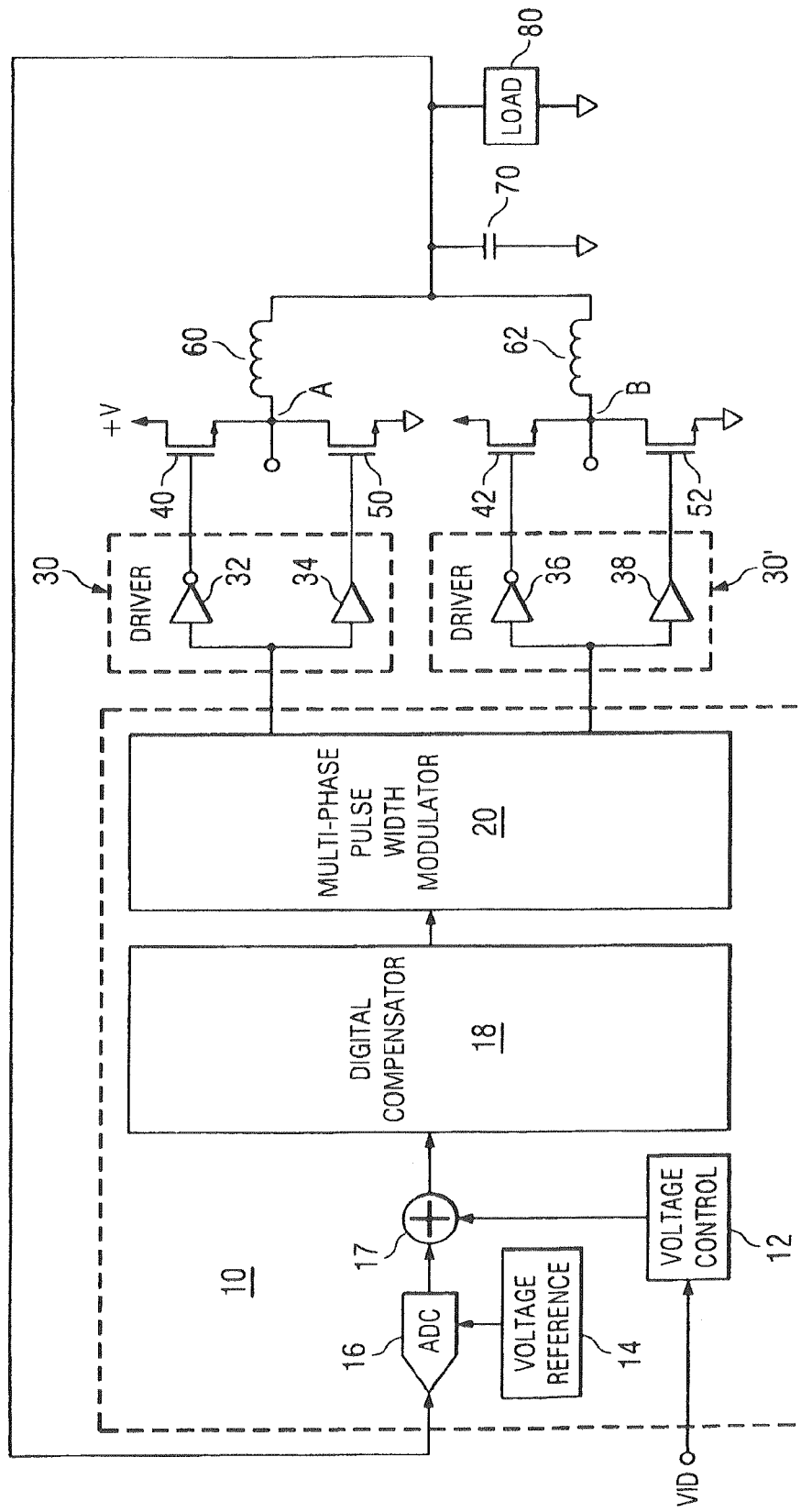
FIG. 1 is a schematic diagram of a digital multiphase buck regulator that was disclosed in some of the related patent applications cross-referenced herein.

Refer now to FIG. 1, which is a schematic diagram of a Digital Multiphase Buck Regulator that has previously been described in detail, for example, in the cross-referenced patent applications that have been incorporated herein by reference. It is also known as a Digital Multiphase Buck Converter because it converts a relatively high supply potential (+V) at e.g. 12 volts to a low voltage, e.g. 1 to 3 volts provided to a load at very high current levels. Digital controller 10 is shown including Digital Multi-phase Pulse Width Modulator (PWM) 20, although frequently PWM 20 is depicted as a distinct power stage. The output of PWM 20 is a series of pulses on each of output lines, the phase 1 output being provided to driver 30 and the phase 2 output being provided to driver circuit 30'. In a multi-phase system having more than 2 phases, additional phases are connected in a similar manner. Low side FETs 50 and 52, inductors 60 and 62, and capacitor 70 are typically discrete devices. In each phase, (say phase 1 for example), a pulse output stage comprises a high side FET (40), a low side FET (50) and an inductor (60). Similarly, the pulse output stage for phase 2 comprises a high side FET 42, a low side FET 52 and an inductor 62. The pulse output stage charges up capacitor 70 and supplies power to the load. Load 80 is typically a microelectronic component, such as a microprocessor, requiring very accurate power that is regulated and maintained during rapidly changing power requirements.

Digital controller 10 receives a VID input at voltage control 12. VID is a digital number provided by the microprocessor manufacturer describing specific power requirements. Digital controller 10 can also have a reference voltage 14 that is applied to analog-digital converter 16 that also receives, as a second input, the voltage at load 80. The reference voltage from block 14 is used to calibrate the output of ADC 16 to that reference voltage. The output of ADC 16 is a digital voltage value that is compared to the output of voltage control circuit 12 (the target voltage) in summer 17 and provided as a digital error voltage to digital compensator 18. Digital compensator 18 then provides an input to PWM 20 in order to modify the width of the pulses provided to the drivers 30 and 30', etc. of each of the two phases in the illustrated example, and other phases, when utilized. Phase 1 is driven by driver circuits 32 and 34. Circuit 32 drives the gate of FET 40 with a signal that is complementary to the output of circuit 34 that drives the gate of FET 50. FET 40 and 50 have their drain-source paths connected in series, at a common point A, between a first potential source (+V) and a second potential source (ground). Since both FET 40 and 50 are shown as N-channel devices, only one of the two transistors is on at any one time. Of course, if transistor 40 were to be replaced with a P-type transistor, then the same phase signal could be used to drive the gate of both transistor 40 and 50. In either case, there is never a direct current path between +V and ground.

The phase 2 output of PWM 20 is provided to circuits 36 and 38 during phase 2 time in the same way that circuits 32 and 34 receive the pulse width modulate signals during phase 1 time. Circuit 36 then drives the gate of FET 42 and circuit 38 drives the gate of FET 52. Note that although two phases are shown, any number of phases can be used. Larger number of phases provides smoother and more accurate power to the load.

In operation, during phase 1, while the pulse width modulated waveform turns high side FET 40 on, current flows through FET 40 into node A and through inductor 60 to charge capacitor 70 and provide power to load 80. On the other hand, when low side FET 50 is turned on, current flows through FET 50. High side FET 42 and low side FET 52, connected in common at node B operate in a similar manner during phase 2. It is desirable to measure the voltage at node A and node B (and other corresponding nodes in systems with more phases) as an indication of the current being supplied to the load. The cross-referenced patent applications show how the measurements taken at nodes A and B are then used to better regulate the power provided to load 80. Unfortunately, voltage measurements taken at nodes A and B are only an approximation of current. The voltage measurement taken at node B for example, when low side FET is in its conductive state is the product of the current and on resistance (also referred to as RDSON) of low side FET 52. Because of process variations in the fabrication of FET 52 and other field effect transistors on the semiconductor chip and the fact that conductance is a function of temperature, measurements taken at nodes A and B, etc. are not a truly accurate measurement of current, unless actual RDSON is known.

Figure 2:
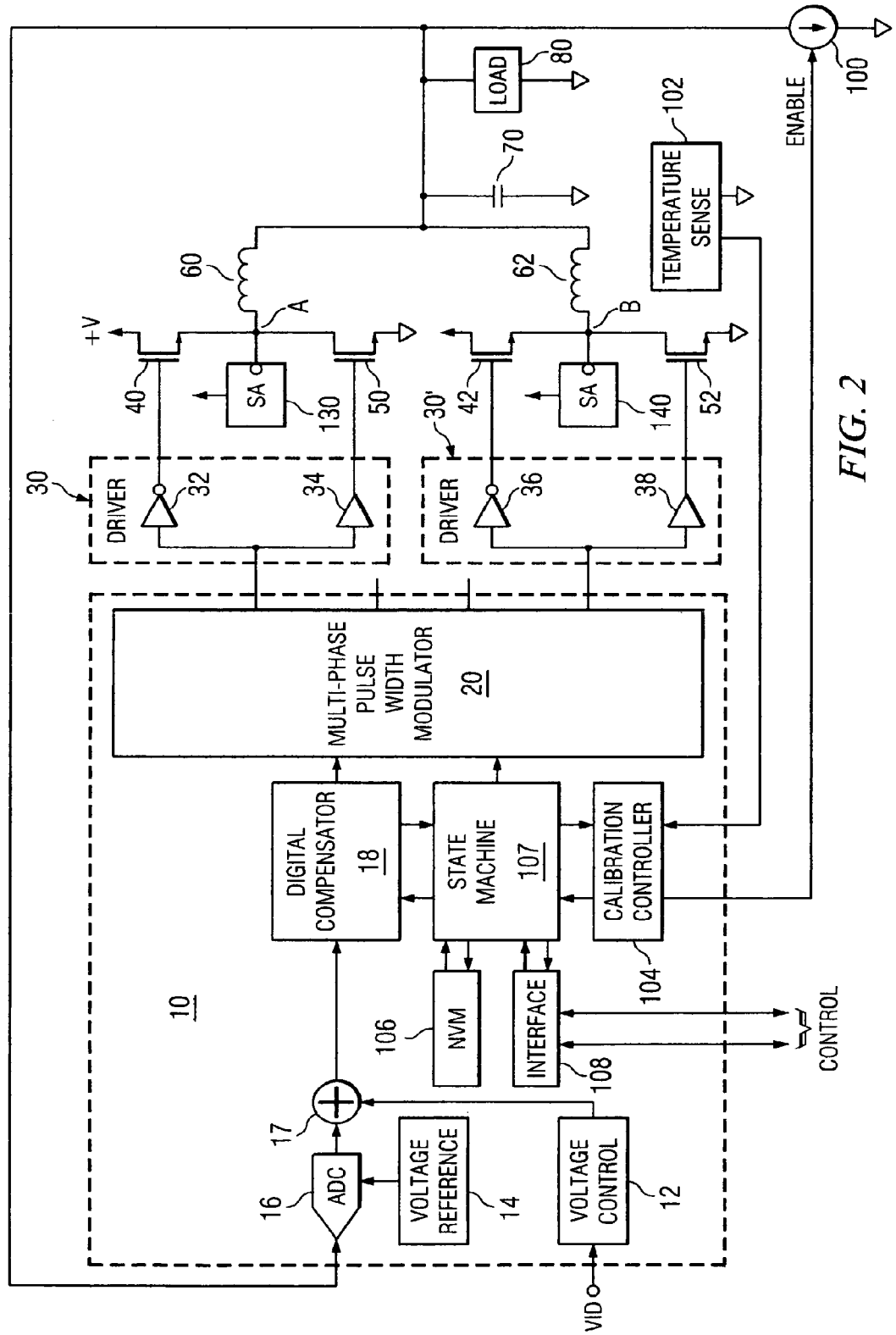
FIG. 2 is a schematic diagram of an embodiment of the invention illustrating the connection of the calibration current source.

Refer now to FIG. 2, which is a schematic diagram of one embodiment of this invention. Components corresponding to FIG. 1 have been identified with corresponding reference numerals. Multi-phase pulse width modulator 20 is coupled to the pulse output stage of each phase through drivers 30 and 30'. As in FIG. 1, each pulse output stage comprises a high side FET (40, 42), a low side FET (50, 52) and an inductor (60, 62), as a two phase system is shown. Additional phases would comprise similar structure.

In the FIG. 2 embodiment, calibration current source 100 has been connected to one side of the inductors, essentially at the load, at a common node formed by one side of capacitor 70 and inductors 60 and 62. It is the function of current source 100 to provide for the calibration of the voltage regulator (VR). Briefly, current source 100 is switchable into one of two states: on or off. In response to an ENABLE signal from calibration controller 104, current source 100 is activated. Otherwise, current source 100 is disabled. Calibration of each phase is performed after two separate measurements, one in each of the two states of current source 100. Otherwise, during normal operation, current source 100 is always disabled.

In accordance with another aspect of the invention, a temperature sensor and sense circuit 102 is placed in close proximity or adjacent contact with low side FET 52. The temperature measurement at FET 52 can be used as an approximation of the temperature of FET 50 (and other low side FETs in additional phases) or, if desired, temperature sensors 102 are placed in close proximity or adjacent contact with all the low side FETs. Alternatively temperature sensors 102 could be placed anywhere that it is desired to measure and/or monitor temperature. The output of temperature sensor(s) 102 is then provided to calibration controller 104.

Calibration controller 104 provides an enable signal to current source 100 during a portion of a calibration cycle (to be described herein below). At all other times, current source 100 remains off and does not affect the operation of the digital multiphase buck regulator. Note that current source 100 can also be referred to as a current sink as it is drawing current (e.g. from node B during phase 2 calibration) in the same direction as leakage current flows into load 80. Leakage current is that small amount of current that is drawn by load 80 when it is in a quiescent or off-state.

In accordance with the FIG. 2 embodiment, a non-volatile memory 106 is also provided. NVM 106 stores the calibration measurements and other data to be read out by state machine 107 during start-up or other times as may be desired. Digital control 10 is connected to a standard control bus, such as an I²C bus or the like through interface module 108. State machine 107 is configured to interact with interface module 108, calibration controller 104, digital compensator 18 and PWM 20. PWM 20 is configured to supply the desired pulse widths at each of its phase outputs.

Figure 3:
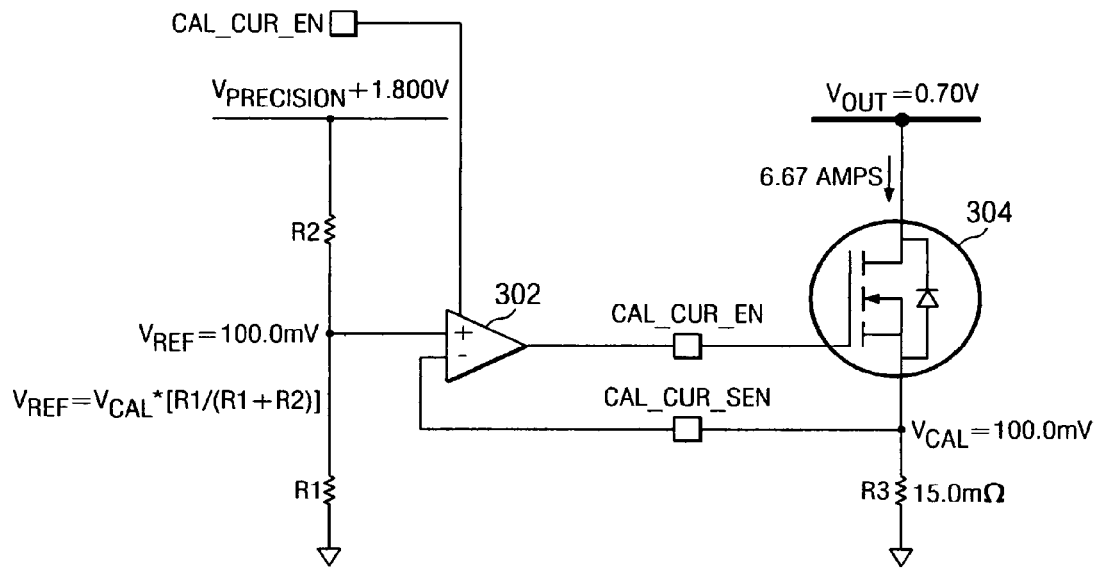
FIG. 3 is a schematic diagram of a calibration current source.

Current source 100 must provide a precise calibration current. Although a simple series connection of an FET and a high value precision resistance can be a current source, an inexpensive precise current source is illustrated in FIG. 3. This precise current source includes operational amplifier 302 that receives a precise reference voltage at one of its inputs. This very precise reference voltage can be generated, for example, by a pair of resistors R1 and R2 of known resistance value connected in series between two precisely known voltage levels such as 1.800 volts and ground potential. The precise reference voltage (VREF) is obtained from the junction of the two resistors. The output of the op amp 302 is coupled to the gate of calibration FET 304 and turns it on when it receives a calibration current enable (cal_cur_en) command from the calibration controller (104 in FIG. 2) coupled to FET 304 through op amp 302. FET 304 can be a relatively small and inexpensive device, such as a type IRLML2502 because it is operated in its linear range and performance variations due to process, etc. are fully compensated by the feedback path arrangement through Op Amp 302. A third resistor R3 of known value is connected between FET 304 and ground potential. The junction of R3 and FET 304 is coupled in a feedback path to the second input of op amp 302 as the sensed voltage developed across resistor R3 by the calibration current (cal_cur_sen). Note that V out is typically a voltage applied at the load when the load is in its quiescent state. In the illustrated example, the selected reference voltage of 100 mv applied to R3, which has an exemplary value of 15.0 milliohms, will generate a calibration current that is precisely 6.67 Amps. Similarly, if R3 is a 10 milliohm precision resistor (say + or −1%), then the calibration current is 10 amps. This known precise current passing through the low side FET (e.g. FET 50 or 52 depending on which phase is being calibrated) permits a precise calculation of RDSON through the simple comparison of the voltage at e.g. node A or B, when in one case: 1. All the load current flowing through the low side FET is leakage current and in another case; 2. When the total current flowing through the low side FET is the sum of the leakage current plus the precise calibration current. As will become more apparent later, the current measured is the average current because the actual current flow varies.

As the requirement for accurately controlled power for microelectronic devices such as microprocessors increases, the requirement for precisely measuring the current at the load increases. The full benefits of the invention described and claimed in the instant application can be realized with an accurate measurement of current (as opposed to voltage) at the load, and in particular, a measurement of current at a known temperature. The embodiments described accomplish the desired accurate current measurements. In the FIG. 2 embodiment, current is sensed at node A by sense amplifier 130 and at node B by sense amplifier 140. Each of the sense amplifiers is then coupled to an analog to digital converter as described in greater detail in the discussion of FIGS. 4 and 11. Although the cross-referenced patent applications connected sense amplifiers at nodes A and B, they could not accurately sense current at those nodes in a lossless manner.

Figure 4:
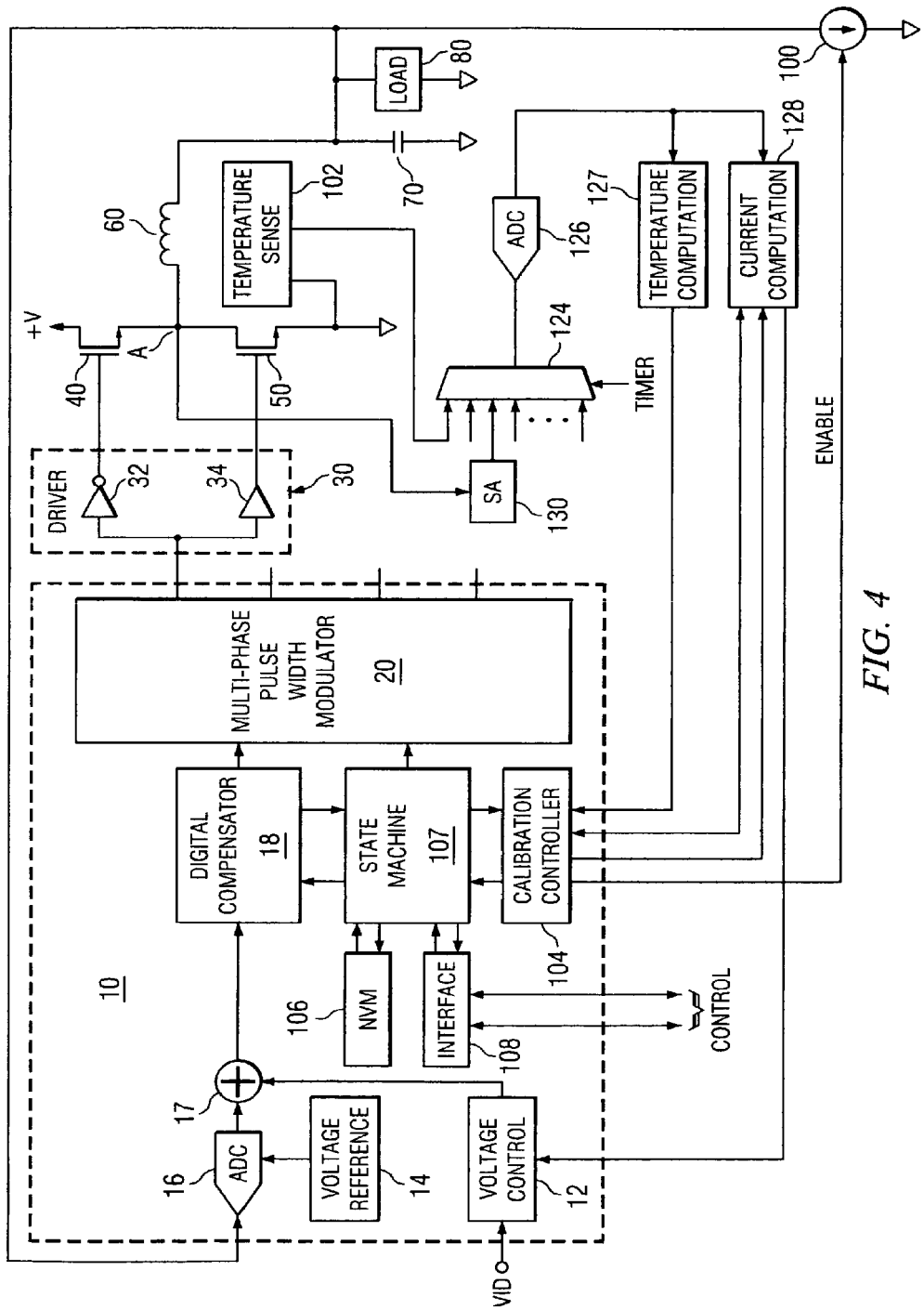
FIG. 4 is a more detailed schematic diagram of an embodiment of the invention.

Referring now to FIG. 4, the lossless sensing of current is illustrated in greater detail for one phase. Sense amplifier 130 provides an output to multiplexer circuit 124 which receives the output of the sense amplifiers of all phases. Multiplexer circuit 124 also receives the temperature input coupled from device 102. This data is gated through multiplexer 124 under the control of a timer signal (e.g from state machine 107) to analog to digital converter 126 where it is digitized.

During calibration, the digitized current data is provided to current computation block 128 and to calibration controller 104. The first and second current measurements are stored in registers in calibration controller 104. Calibration controller 104 compares the first and second measurements (to be described in greater detail) and provides the result (which is RDSON or its equivalent) and provides this value back to the computation block 128 as the scaling term to compute current from the ADC converter 126.

The digitized temperature data is coupled to calibration controller 104 through temperature computation block 127. Calibration controller 104 provides this temperature related data to current computation block 128. This temperature adjusted current computation i.e. the digitized current data is coupled to voltage control circuit 12. This temperature adjusted digitized current data is used by voltage control 12 together with the VID input to generate an adjusted target voltage provided to summer 17. Thus, the error signal provided by summer 17 to digital compensator 18 is adjusted in response to the accurate temperature compensated current measurements.

Figure 5:
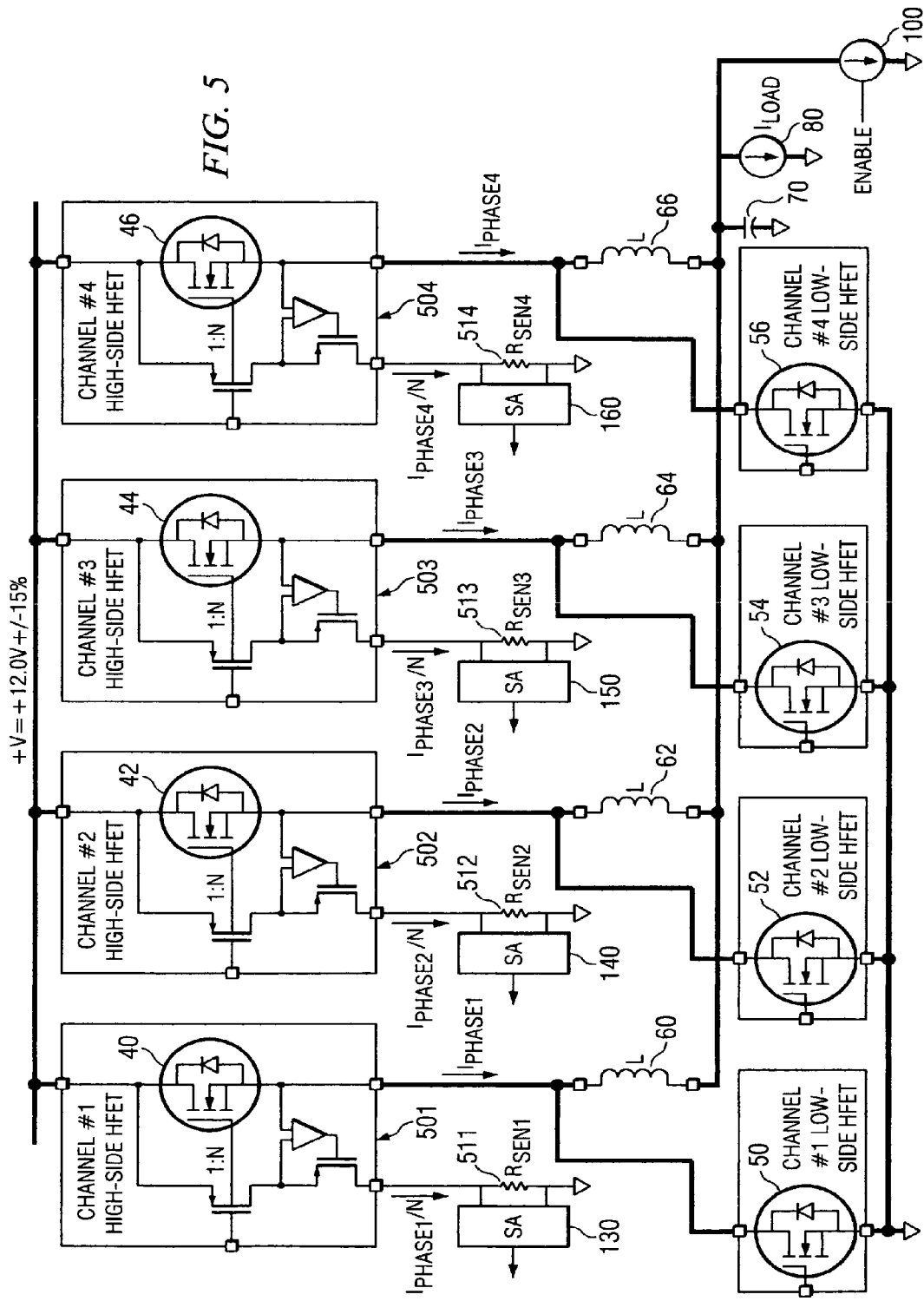
FIG. 5 is a schematic diagram of another embodiment of the invention utilizing a current mirror and precision resistor to measure current across the high side FET.

In accordance with the present invention, current flowing through the load can be measured by lossless techniques other than determining the RDSON of the low side FET. Refer now to FIG. 5, which illustrates a lossless technique for measuring load current utilizing a current mirror and precision resistor placed in parallel with the high side FET. FIG. 5 is similar to FIGS. 1, 2 and 3 and to the extent possible, corresponding elements have been numbered with corresponding reference numerals. However, since the FIG. 5 embodiment is a four phase example, additional high side FETs 44, 46, additional low side FETs 54, 56, and additional inductors 64, 66 have been added. Note that block 501 includes, in addition to high side FET 40, a current mirror with a 1:N ratio. This results in a current that is a known ratio of the high side FET current. This current can be measured by measuring the voltage across current mirror resistor (Rmirror) 511; which has a known precise value. Similarly, blocks 502, 503, 504 (for phases 2,3, and 4) include a current mirror in addition to the high side FET. The current in the second, third and fourth phases is measured across precision current mirror resistors 512, 513, and 514, respectively. The current passing through the current mirror will track the load current with temperature. However, the high side FET is typically conducting for a much shorter period than the low side FET and therefore represents the load current for a shorter period of time. Also, the extra chip area used by the current mirrors and the need for precision resistors can increase the cost of sensing current with this embodiment. Most significantly, the power consumed by the current mirror is negligible so that the current is sensed essentially in a lossless manner.

In the FIG. 5 embodiment, calibration can compensate for various process induced differences in the components. For example, variations in the actual ratio of the current mirror current to the current passing through the high side FET can be compensated. As in other embodiments, variations in the response of sense amplifiers 130, 140, 150 and 160 can be compensated. For example, when the low side FETs are on, the corresponding high side FETs are off and the resultant sense amplifier output should indicate zero current. To the extent a sense amplifier provides a current that is not zero, this is a known error that can be compensated by subtracting out the error in the measured current.

Figure 6:
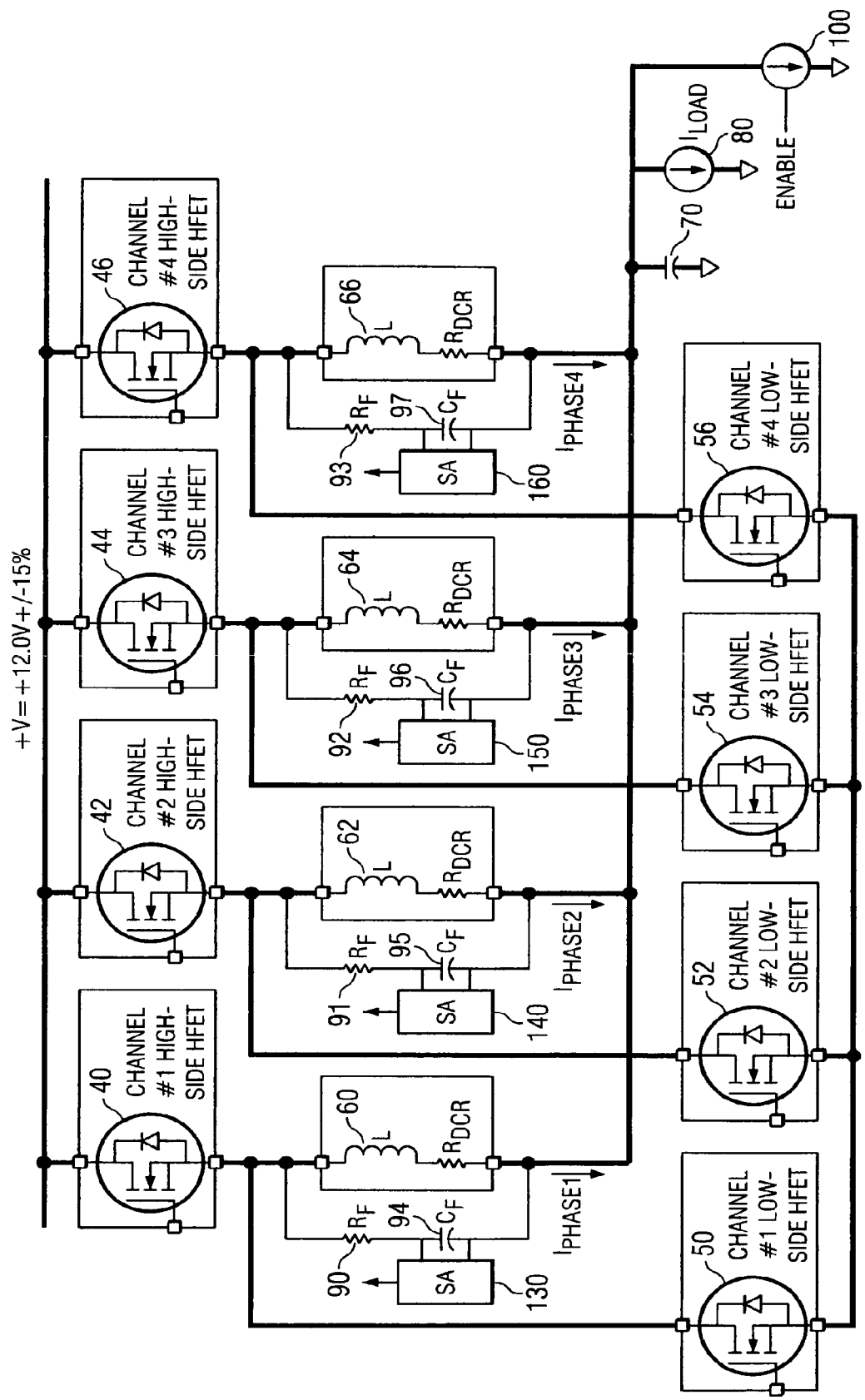
FIG. 6 is a schematic diagram of a still further embodiment of the invention illustrating current measurement at the inductors.

Refer now to FIG. 6, for a still further embodiment, sensing current through the direct current resistance (DCR) of an inductor. As in FIG. 5, FIG. 6 illustrates a four phase system. Corresponding elements have again been numbered with corresponding numerals. In each phase, a resistor and capacitor have been added in parallel with the inductor. Thus phases 1-4 have resistors 90, 91, 92, and 93 and capacitors 94, 95, 96, and 97, respectively connected in series in each stage and in parallel with the inductor in that phase, all as shown. In addition the DC resistive component is separately shown for each of the inductors as RDCR. It is known that all inductors have inherent DC resistors. However, in this example, inductors with relatively high DC resistance with known resistor values are selected. This permits accurate current measurement in a Wheatstone Bridge like arrangement. The AC component of the voltage is filtered out and the voltage across the capacitors 94, 95, 96, and 97 is the same as the voltage across the corresponding RDCR resistor. Therefore, a voltage measurement across these capacitors provides the actual current simply by dividing the voltage by the current. The processing of this precisely known current is then accomplished in the same manner as the other embodiments.

Figure 7A:
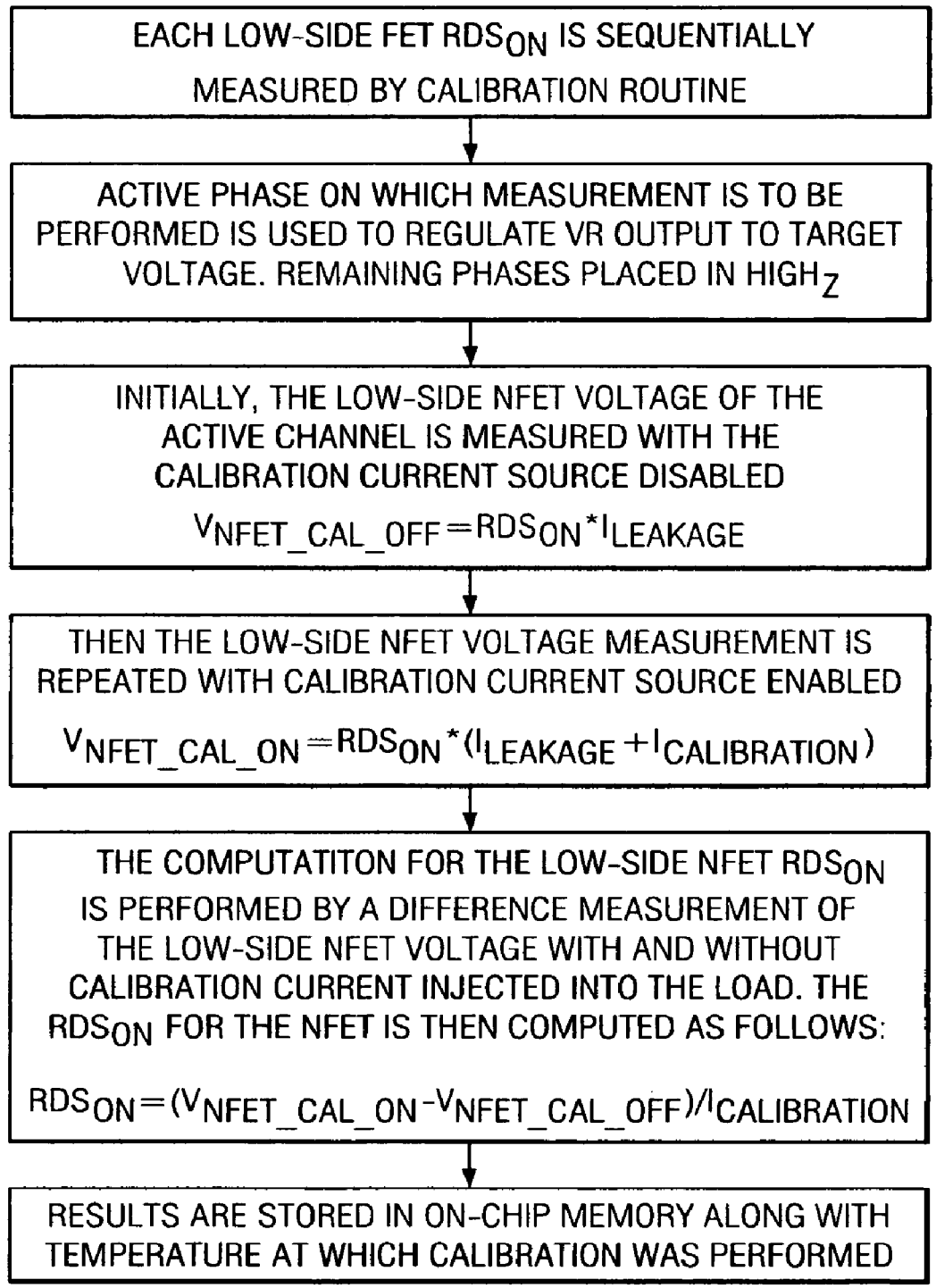
FIGS. 7A, 7B, and 7C are flow charts depicting current measurement methods in accordance with the invention.
Figure 11:
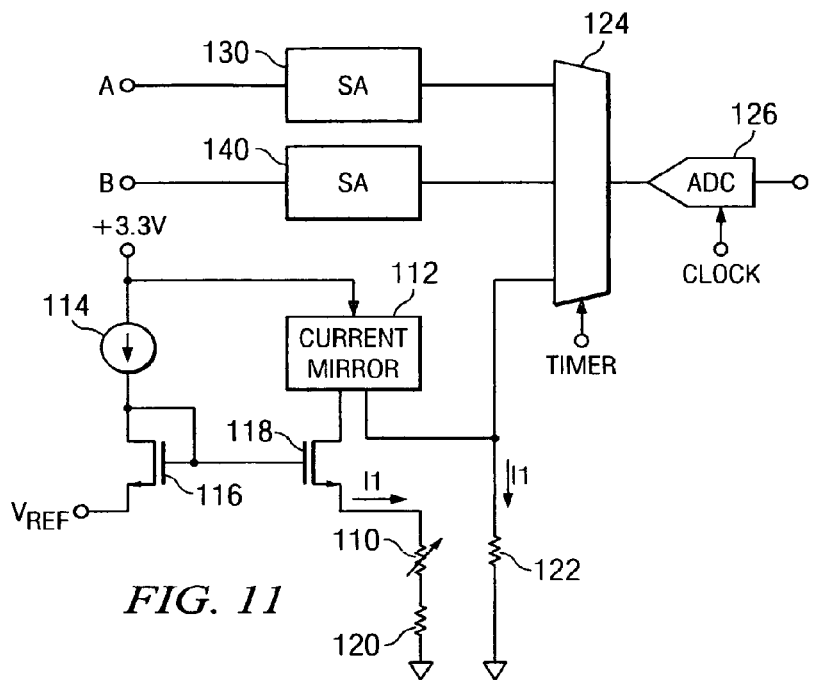
FIG. 11 is a schematic diagram illustrating the multiplexing and digitizing of sensed temperature and sense amplifier outputs.

Refer now to FIG. 7A, which describes in flow chart format an example of how the conductance of each of the low side FETs (50 and 52 in FIG. 2) is determined with the use of the precise calibration current. The measurement process is applied to one phase at a time until each low-side FET is measured by the calibration routine. The selected active phase in which measurement is to be performed is used to regulate the voltage regulator (VR) output to the target voltage while all other phases have both the high side FET and low side FET placed in a high impedance state (i.e. turned off). Consider first the measurement of FET 50 in the phase 1 channel. With FET 50 on, the voltage VNFET at node A is due to leakage current through the load assuming that initially calibration current source 100 is turned off. (Note that calibration current source 100 has two states: enabled (activated) and disabled.) A measurement is taken in each of the two states. (Thus, alternatively, the first measurement could be taken with current source 100 turned on.) In the case where calibration source 100 is initially disabled, the voltage at node A (VNFET) equals the on resistance of the FET (RDSON) times the leakage current. This voltage value is sent through a sense amplifier (as shown in FIG. 11), digitized in an analog to digital converter (e.g. 126 in FIG. 11 and FIG. 4) and stored on chip for example in registers in calibration controller 104 or in non-volatile memory 106 (see FIG. 4), as desired.

Next, the calibration current unit 100 is turned on so that the voltage at node A (VNFET) becomes RDSON times the sum of the leakage current plus the calibration current. This second voltage value is also sent to the calibration controller 104: which performs the required calculation determining that RDSON is equal to the difference between the two voltages divided by the calibration current (I calibration). Thus, as the second voltage measurement is compared to the first and RDSON is determined to be equal to the absolute value of the difference between the two voltages (VNFET_CAL_ON minus VNFET_CAL_OFF) divided by the calibration current (I calibration). This result is stored on chip, for example, in storage registers in calibration controller 104, or alternatively in non-volatile memory 106 as desired. On chip storage (either in calibration controller 104 or non-volatile memory 106) also stores the temperature at which the calibration was performed, as well as other information including differences in the characteristics of each of the phase sense amplifiers and the leakage current of the load.

Figure 7B:
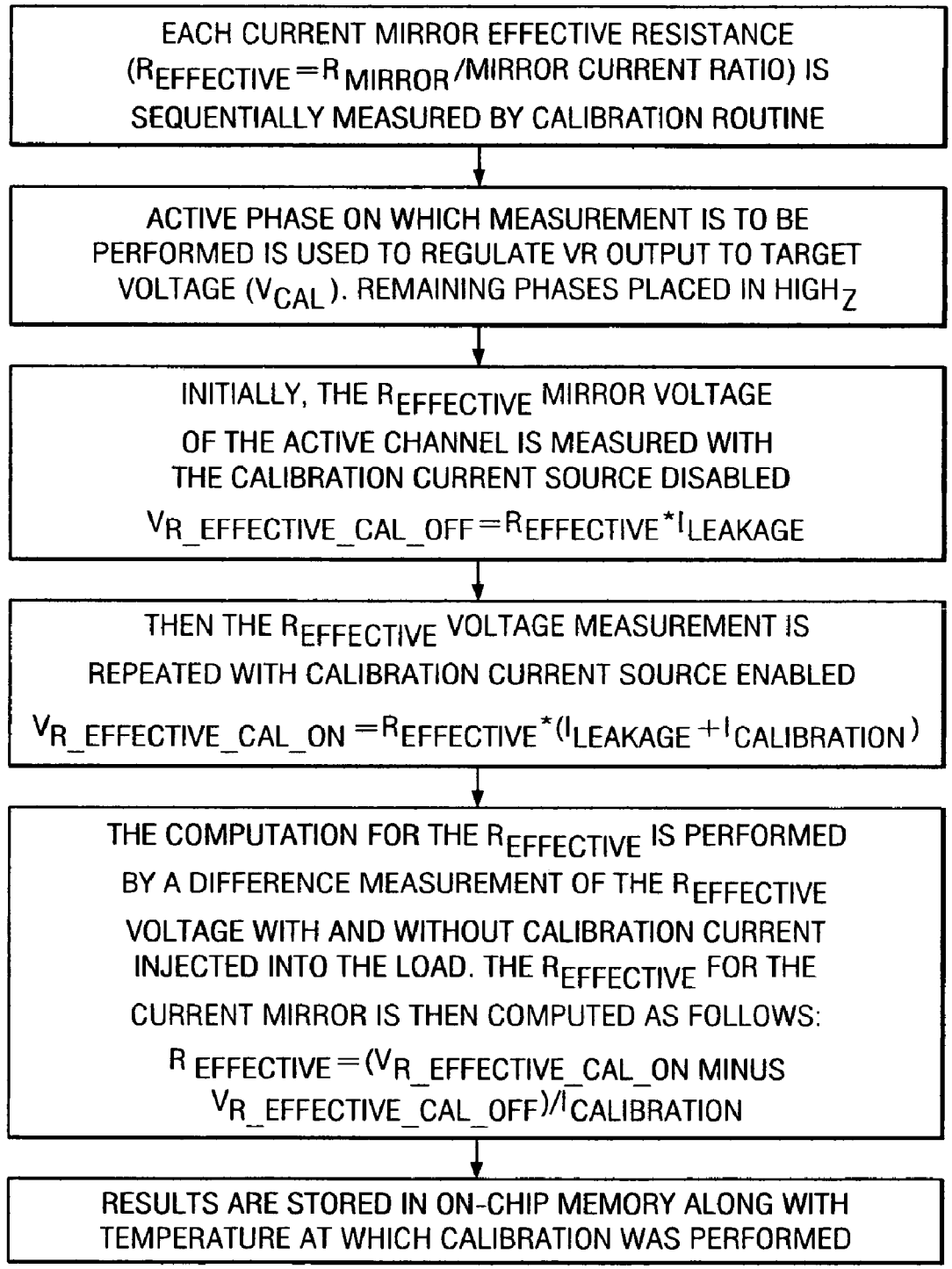

Refer now to FIG. 7B; which illustrates a calibration routine similar to that described in FIG. 7A. However, FIG. 7B describes the calibration measurement method used when the lossless current measurement is performed with the current mirror circuit illustrated in the FIG. 5 embodiment. The current mirror effective resistance (Reffective) is essentially the value of an equivalent resistance if it were placed in series with the high side FET. It is defined by dividing the known resistance of the current mirror resistor (Rm), e.g. resistor 511 by the mirror current ratio N and is measured sequentially for all the phases by the calibration routine. The active phase (to be measured) is used to regulate the voltage regulator to target voltage (Vcal) while the remaining phases are off i.e. set in their high impedance state. With the current calibration source in a first state, e.g. off, the Reffective mirror voltage of the active channel is measured and stored. The measurement is repeated with the current calibration source in its second state, e.g. on. The comparison (subtraction) of the two voltages divided by the calibration current provides the value of Reffective. The results are stored on chip memory along with the temperature at which the calibration was performed.

Figure 7C:
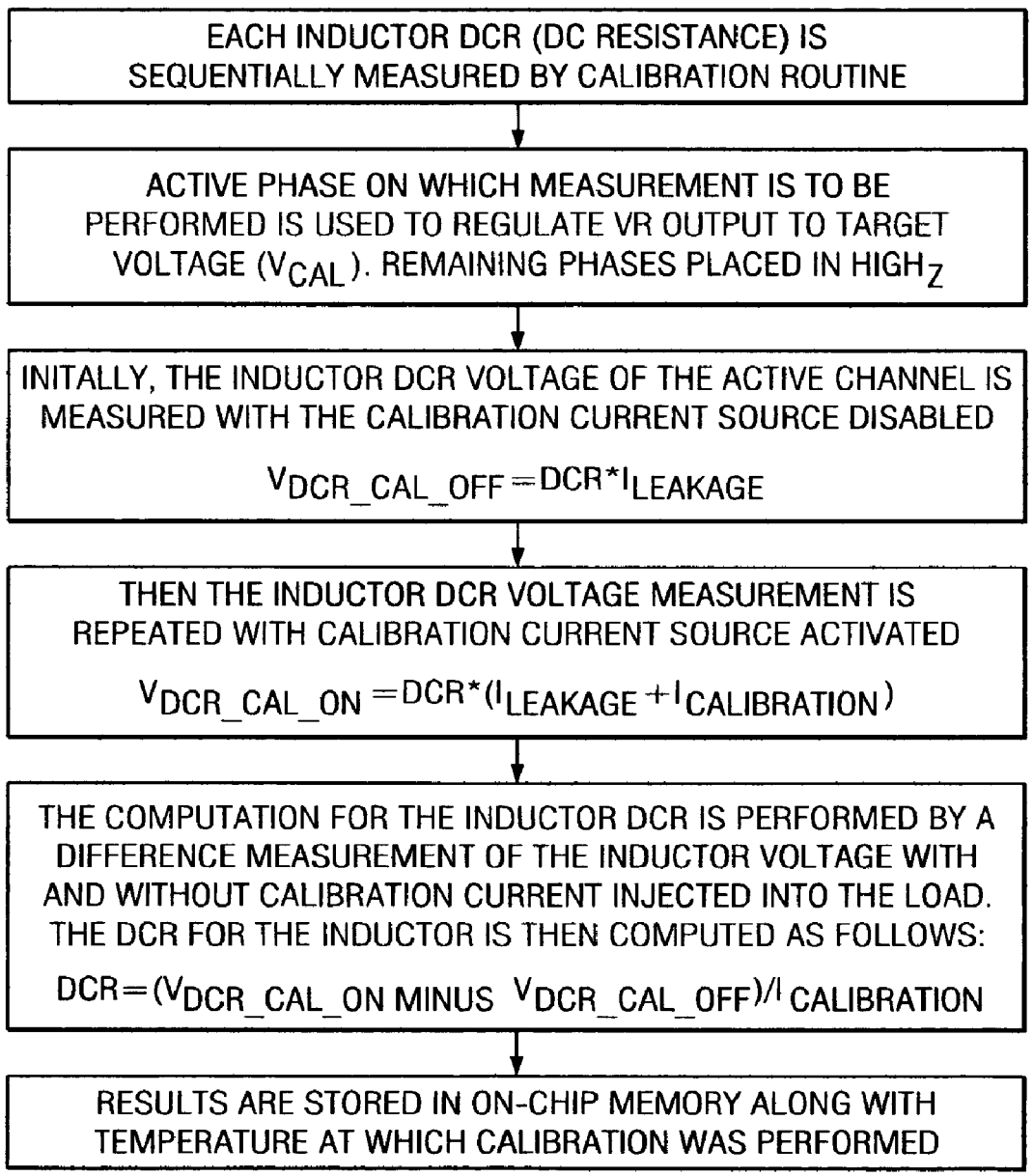

Refer now to FIG. 7C, which illustrates a calibration routine similar to that described in FIGS. 7A and 7B. However FIG. 7C describes the calibration measurement method used when the lossless current measurement is performed with the inductor DC resistance (DCR) illustrated in the FIG. 6 embodiment. Each inductor DC resistance is sequentially measured by the calibration routine. While the active phase on which measurement is used to regulate the voltage regulator output to target voltage (Vcal) is turned on, all other phases are turned off. With the calibration current source in a first state (e.g. disabled/off), the inductor DCR voltage of the active channel is measured and stored. Then the inductor DCR measurement is repeated with the calibration current source in its second state (e.g. activated/on). The computation of inductor DCR is simply the difference between the two measured voltages (1. voltage measured with the calibration current source in first state minus 2. voltage measured with the calibration current source in second state) divided by the calibration current. Results are stored along with temperature as in the other calibration methods.

Figure 8:
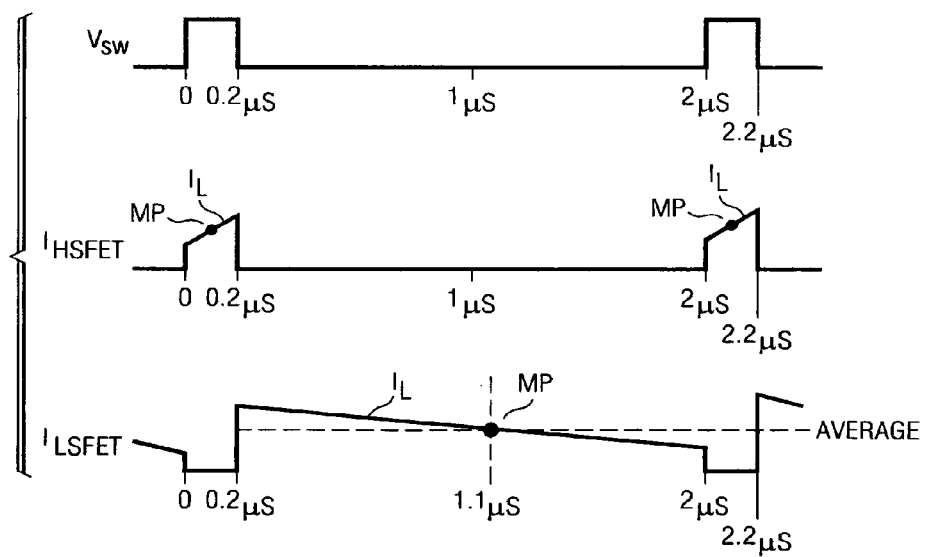
FIG. 8 illustrates exemplary waveforms.

The operation of the invention is further explained by the current and voltage waveforms occurring in one phase, as shown in FIG. 8. The top waveform illustrates a voltage (Vsw) provided to a high side FET (such as FET 42 in FIG. 2). In the exemplary time line, a 2 microsecond cycle is illustrated. The positive voltage pulse turns the high side FET on for about 200 ns, i.e. 10% of the time. As previously noted, when the high side FET is on, the low side FET is off. When the high side FET 42 is on, it conducts current as shown by the second waveform (I high side FET). The current ($I_L$) through the inductor (e.g. 62 in FIG. 2) is then represented by the positive slope that can increase, for example, from 15 to 30 amperes. After the high side FET (e.g. 42 is turned off and low side FET (e.g.) is turned on, the current through the low side FET (I LSFET) is represented by the third waveform. The current through the inductor ($I_L$), such as inductor 62, for example, is then represented by the down slope of the waveform.

The actual current desired to be measured to determine RDSON of the low side FET is the average current which is measured at the mid-point (MP) of the "on" state of the low side FET (e.g. 52). Average current, of course, is readily obtained by analog measurements and it is then possible to convert that value through an analog to digital converter. However, average current can be determined digitally by locating the midpoint (MP) based on the timing of the pulse from the falling edge, the leading edge or both. In the case of using the trailing edge, the midpoint is at the cycle time plus the pulse width, the sum divided by 2. Using the leading edge, the midpoint (MP) is at the cycle time minus the pulse width of the next pulse, the difference divided by 2. Using both trailing and leading edges, the midpoint (MP) is at the cycle time divided by 2. A strobe pulse provided near the midpoint (MP) is adequate as sequential measurements will average out cycle to cycle variations. In the case of current mirror sensing, the average current desired to be measured to determine the current mirror effective resistance is the midpoint (MP) of the current through the high side FET. In the case of DCR sensing, the actual current desired to be measured to determine the DC resistance of the inductor is the midpoint of the current through the inductor (current through both the high side FET and the low side FET).

Figure 9:
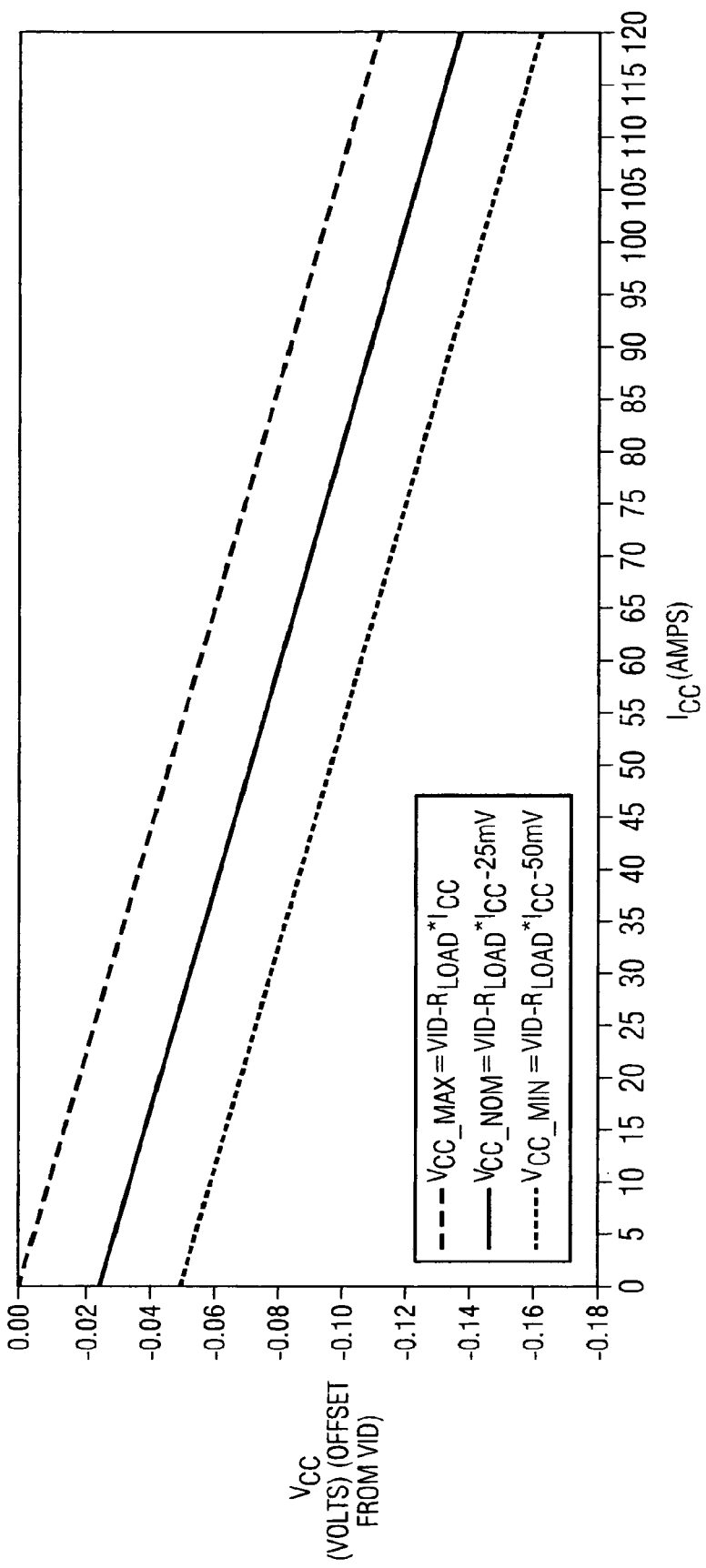
FIG. 9 is a waveform diagram illustrating exemplary load line specifications.

Refer now to FIG. 9, which is a waveform showing the load line requirements of a typical microprocessor. As current requirements increase, the regulated voltage must be decreased. In fact, FIG. 9 is an idealized situation showing the nominal load line in the middle with the permitted deviations to the upper or lower parallel lines. In practice, it has been noted that there is a load line shift due to inductance in packaging leads and other factors such as leakage current.

Figure 10:
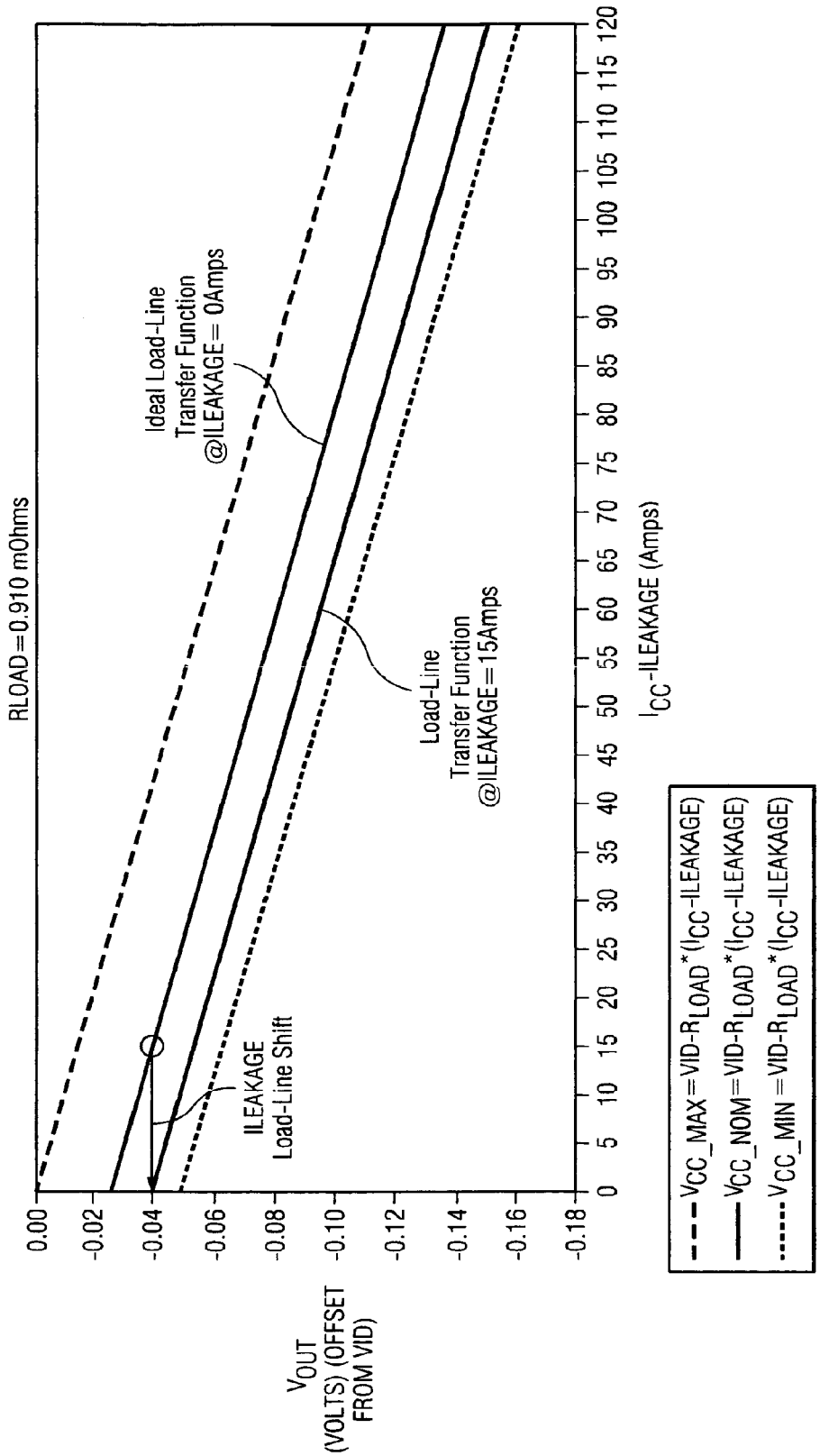
FIG. 10 is a waveform diagram illustrating digital correction of a load line shift.

The waveform in FIG. 10 illustrates the load line shift resulting from leakage current, which in the illustrated example is 15 amps. If left uncorrected, the tolerance for permitted deviations to the lower minimum is substantially reduced. However, the present invention permits the digital subtraction of the leakage current, in effect returning the load line to the middle of the range between the permitted excursions in both the negative and positive directions.

Refer now to FIG. 11, which is a schematic diagram showing the temperature measurement aspect of the present invention. A thermistor 110 having a negative temperature coefficient (TC) is placed proximate or adjacent (in effect as close as physically reasonable) to each low side FET. A reference voltage (Vref) of, for example approximately 1.2 volts is applied to the thermistor through one side of current mirror 112, as controlled by current source 114 and field effect transistors 116 and 118. Thermistor 110 has a resistance of approximately 20K ohms at 25 degrees centigrade. To minimize the variation in sensor current, resistor 120 is placed in series between thermistor 110 and ground potential to linearize its response. When resistor 120 has a resistance value of approximately 3.9K ohms, then the total series resistance path is approximately 23.9K ohms so that the reference voltage of approximately 1.2 volts results in a current I1 of approximately 0.05 ma. This current I1 (if the current mirror 112 has a 1:1 ratio) is mirrored by current mirror 112 to external resistor R122 (which in the present illustrative example has a value of 5K ohms) where it is converted to a voltage input to analog multiplexer 124. The timer input can be adjusted to sample the voltage input several times, each value being outputted to analog to digital converter 126. The analog to digital converter provides the digitized temperature values (ADC codes) to the temperature computation block 127 and then to calibration controller 104 in digital controller 10 (FIG. 4). Because of the residual curvature in the temperature to ADC code transfer function, a look up table can be used for extracting the precise temperature. Alternatively, the non-linear curve can be partitioned into approximately linear sections, as defined by the two most significant bits (MSB), in temperature computation block 127, for example.

Figure 12:
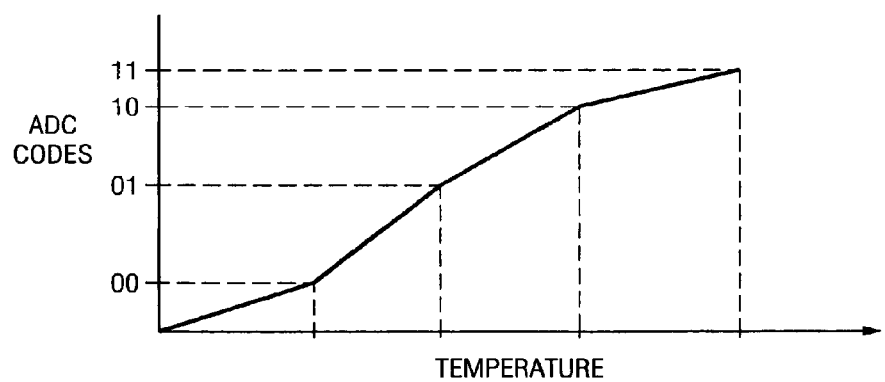
FIG. 12 is a waveform diagram illustrating sensor digital codes v. temperature.

The correction of the residual curvature in the temperature to ADC code transfer function is further illustrated in the waveform diagram of FIG. 12. Assuming six digit ADC codes, the two most significant bits (MSB) can be used to identify a temperature in each quarter of the range, the remaining bits can be used to similarly partition and precisely identify ADC codes in e.g. 10 degree centigrade increments over the entire temperature operating range.

It has also been found that the sense amplifiers receiving the current sense signals from each of the phases require calibration to compensate for e.g. process variations. With continued reference to FIG. 11, sense amplifiers 130 and 140 are shown receiving inputs from phase 1 and phase 2 (nodes A and B in FIG. 2), respectively. During the calibration process it is known that the same leakage current passes through the load and the voltage at the load in its quiescent state is constant. Thus, all the sense amplifiers, such as 130 and 140 should provide the same value and any difference is an error due primarily to process variations. To the extent that sense amplifiers, such as 130 and 140 provide different values, they can be normalized. The output of sense amplifier 130 is gated through analog multiplexer 124 by a suitably timed timer signal to ADC 126, during phase 1 calibration. Similarly, the output of sense amplifier 140 is gated through analog multiplexer 124 during phase 2 calibration. The digitized signals can have subtractions or additions applied so that output differences based on process variations are compensated. In this way, variations in the channels can be measured and compensated.

Figures 13, 14:
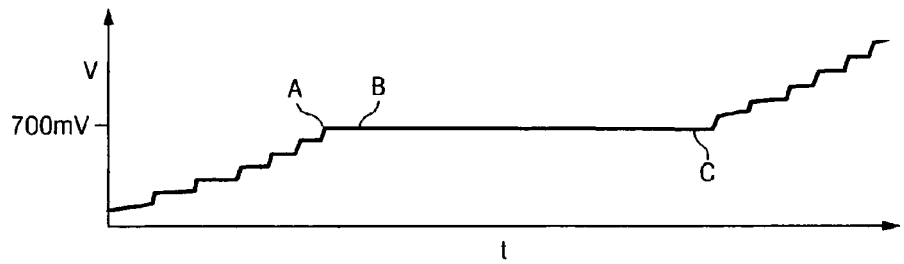
FIG. 13 is a waveform diagram illustrating calibration measurement in accordance with the invention.
FIG. 14 is a table describing the sequence of turning phases on and off for the calibration of a four phase system.

Refer now to FIG. 13, which is a waveform diagram illustrating the output voltage at the load as a function of time. In order to bring the voltage to point A, all the phases are activated. To minimize transients, it is possible to turn a phase output on during the time of another phase. For example, when channel 1 is turned on during phase 1 time, it is possible to turn channel 2 on at the same time, as well. This can be repeated with all the channels of a multi-phase system until all the channels are active. The voltage is brought to point A and calibration of the phases begins shortly thereafter at point B. After all the channels have been calibrated (point C), the voltage is brought to the operational target voltage. The calibration process of each phase is illustrated in FIG. 14.

Refer now to FIG. 14, which is a truth table further illustrating the method of calibrating a multi-phase voltage regulator with a calibration current source in accordance with the present invention. The measurements are taken twice, once with the calibration current in a first state and then with the calibration current in a second state. For this example, assume that the calibration current source has been set in its activated/on state. With all phases also set in the active state, the truth table illustrates in the first row that all four phases and the calibration current are active. As shown in the second row, phase 2 is deactivated. As shown in the third row, phase 3 is deactivated. Then as shown in the fourth row phase 4 is deactivated showing that only phase 1 is on. As previously noted, turning off one phase at a time minimizes transients. At this point, the first of two measurements of phase 1 is taken. The physical circuit location where the measurement is taken depends on the configuration of the embodiment utilized.

Next, phase 2 is turned on in addition to phase one being kept on. Next, phase 1 is turned off. At this point only phase 2 is on and can be measured. Next phase 3 is turned on. Next phase 2 is turned off, so that phase 3 can be measured. Next phase 4 is turned on. Next, phase 3 is turned off so that phase 4 can be measured. Additional phases (in a system with more than 4 phases) can then be measured by repeating the last two mentioned steps.

At this point, the calibration current source is set into its second state, e.g. off, and the aforementioned steps are repeated in reverse until all phases are active again on the last line of the truth table. In each case, the two measurements for each phase (once with the calibration current on and once with the calibration current off) can be stored and compared to obtain the resistance value that permits the obtaining of the accurate current value. As noted in column 6 of FIG. 14, an alternative method would set the calibration current source off for the first measurements and on for the second set of measurements. In either case, when the last line is reached, point C on the waveform diagram of FIG. 13 is reached and the voltage regulator can proceed to increase its output to the operational target voltage required by the load.

In summary, what has been described is a multi-phase switched power converter that supplies accurate power during rapidly changing power requirements at the load. Highly accurate power is provided by the ability to measure actual current values at the load and compensating by digital processing (e.g. subtracting one current value from another). The current is measured at a known measured temperature and non-linear temperature variations are also compensated digitally. The absolute value of current is measured individually in each channel. This permits the balancing of each channel, calibration of the voltage regulator and the ability to provide accurately compensated power to the load. What has also been described is a calibration process that minimizes transients.

The present invention has been described above with reference to various exemplary embodiments. However, those skilled in the art will recognize that changes and modifications may be made to the exemplary embodiments without departing from the spirit and scope of the present invention. For example, the various components may be implemented in alternate ways, such as, for example, by providing other configurations of SPC's. Such changes or modifications are intended to be included within the spirit and scope of the present invention, as set forth in the following claims.

What is claimed is:

1. A multiphase power regulator comprising:
    a multiphase pulse width modulator;
    a pulse output stage comprising a high side FET, a low side FET and an inductor coupled to the multiphase pulse width modulator;
    a sense amplifier coupled to the pulse output stage for sensing current;
    an analog to digital converter coupled to the sense amplifier for converting the sensed current into digital form;
    a calibration current source coupled to the inductor and adapted to generate a precise calibration current;
    a current mirror coupled to the high side FET, the sense amplifier being coupled to the current mirror; and
    a sensing resistor, the sense amplifier being coupled to the sensing resistor.

2. A multiphase power regulator as in claim 1, further comprising:
    a temperature sensor positioned adjacent said pulse output stage.

3. A multiphase power regulator as in claim 1, further comprising:
    a temperature sensor positioned adjacent said low side FET.

4. In a closed loop system, a digital multiphase power regulator adapted to operate in a normal operating state or calibration state, comprising:
    a digital controller;
    a first high side field effect transistor and a first low side field effect transistor connected at a first common point therebetween, forming a series connection between a first and second potential source;
    a first node at said first common point between said first high side field effect transistor and said first low side field effect transistor connected to one end of a first inductor, the other end of said first inductor coupled to a common connection of a capacitor and a load;
    a second high side field effect transistor and a second low side field effect transistor connected at a second common point therebetween, forming a series connection between said first and second potential source;
    a second node, at said second common point between said second high side field effect transistor and said second low side field effect transistor connected to one end of a second inductor, the other end of said second inductor connected to said common connection of said capacitor and load;
    a first sense amplifier coupled to the first common point;
    a second sense amplifier coupled to the second common point; and
    a switchable current source coupled between said common connection and said second potential source, wherein said switchable current source is adapted to:
        apply a precise calibration current through said common connection of said capacitor and load during at least a portion of the calibration state; and
        be disabled during the normal operating state.

5. A digital multiphase power regulator as in claim 4, wherein said switchable current source comprises:
    a reference voltage source;
    an operational amplifier having an input coupled to the reference voltage source;
    an input electrode of an FET coupled to the output of the operational amplifier; and
    an output electrode of said FET being coupled to a second input of said operational amplifier.

6. In a closed loop system as in claim 4, a digital multiphase power regulator further comprising:
    a series connected resistor and capacitor connected in parallel with said inductor, said sense amplifier being coupled to the junction between said resistor and capacitor.

7. In a closed loop system as in claim 4, a digital multiphase power regulator further comprising:
    a calibration current source coupled to one side of said inductor;
    the other side of the inductor being coupled to a common node formed by said high side FET and said low side FET; and
    a sense amplifier coupled to said common node.

8. In a closed loop system as in claim 4, a digital multiphase power regulator further comprising:
    a reference voltage source;
    an operational amplifier having an input coupled to the reference voltage source;
    an input electrode of an FET coupled to the output of the operational amplifier; and
    an output electrode of said FET being coupled to a second input of said operational amplifier.

9. In a closed loop system as in claim 4, a digital multiphase power regulator further comprising:
    a temperature sensor positioned adjacent said pulse output stage and having an output coupled to a multiplexer; and
    said first and second sense amplifiers each having an output coupled to said multiplexer.

10. In a closed loop system as in claim 4, a digital multiphase power regulator further comprising:
    a storage for receiving and storing an output from said first sense amplifier and said second sense amplifier during a first measurement;
    said storage also receiving and storing an output from said first and second sense amplifiers during a second measurement; and
    a compare circuit coupled to an output of said storage for subtracting the stored output from one of said first and second measurements from the other of said first and second measurements.

11. In a closed loop system as in claim 4, a digital multiphase power regulator further comprising:
    first and second current mirrors each coupled to a corresponding one of the first and second high side field effect transistors,
    first and second sensing resistors each coupled to a corresponding one of the current mirrors; and each of said first and second sense amplifiers being coupled to a corresponding one of said first and second sensing resistors.

* * * * *